W. DORTON & J. S. BOYER.
SPROCKET.
APPLICATION FILED APR. 15, 1910.
975,753.
Patented Nov. 15, 1910.
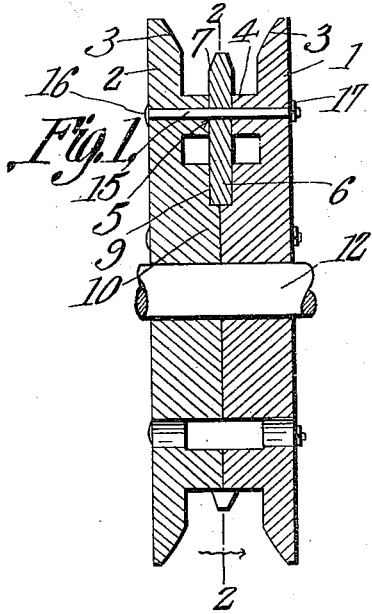
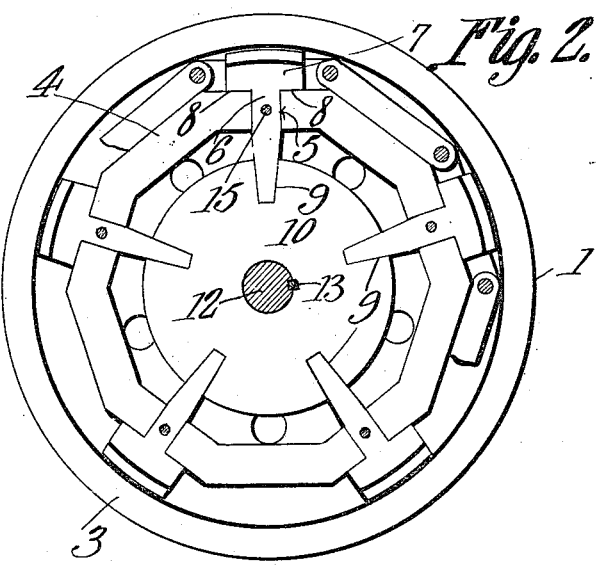
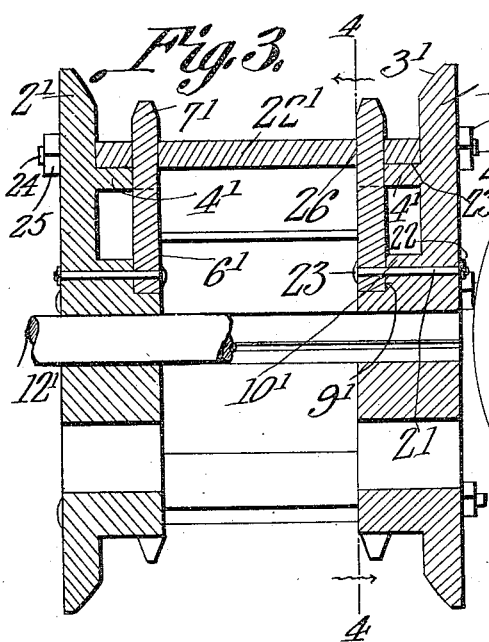
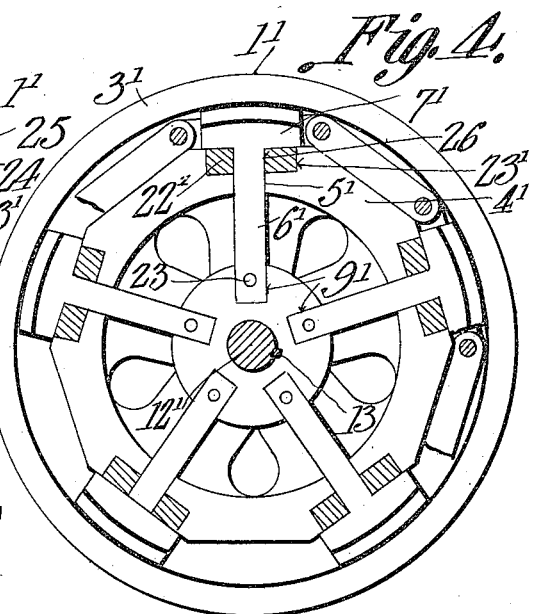
William Dorton
John S. Boyer,
Inventors
Witnesses
by
Attorneys

UNITED STATES PATENT OFFICE.

WILLIAM DORTON AND JOHN S. BOYER, OF LEADWOOD, MISSOURI.

SPROCKET.

975,753.

Specification of Letters Patent.   Patented Nov. 15, 1910.

Application filed April 15, 1910.   Serial No. 555,633.

*To all whom it may concern:*

Be it known that we, WILLIAM DORTON and JOHN S. BOYER, citizens of the United States, residing at Leadwood, in the county of St. Francois, State of Missouri, have invented a new and useful Sprocket, of which the following is a specification.

This invention relates to sprocket wheels, and the device of the present invention is adapted to be used in connection with either single or double sprocket chains.

It is well recognized that both sprocket chains and sprocket wheels are subject to great wear. The wear on the sprocket chain causes it to become longer or looser on the sprocket wheel, and the wear upon the wheel causes it to decrease in diameter. The lengthening or loosening of the sprocket chain and the wearing down of the sprocket wheel, produce a liability not only of either the sprocket chain or the sprocket teeth breaking, but also of the sprocket chain becoming disconnected from the sprocket teeth, even though no breakage may occur. This accidental disconnection of the sprocket chain from the sprocket wheels is a very common occurrence, and the results thereof are sometimes disastrous and always annoying. Moreover when this accident once occurs, it is likely to recur often, unless the sprocket wheel and chain are replaced immediately.

One of the objects of the present invention is to provide a sprocket wheel having sprocket teeth or projections which can be easily and quickly removed and replaced with new teeth, without necessitating, even, the removal of the sprocket chain from the sprocket wheel during the repairing thereof.

A further object of the invention is to provide means for preventing the sprocket chain from becoming disconnected from the sprocket wheel, even though it may slip off of the sprocket teeth.

Further objects of the invention are generally to improve the construction of sprocket wheels, as well as to increase their efficiency in use and to decrease the expense attending their manufacture and maintenance.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawings forming part of this specification:—Figure 1 is a cross section through a wheel constructed in accordance with the invention. Fig. 2 is a section on the line 2—2 of Fig. 1. Fig. 3 is a sectional view similar to Fig. 1 showing a modification. Fig. 4 is a section on the line 4—4 of Fig. 3.

Like reference numerals indicate corresponding parts in the different figures of the drawing.

The sprocket wheel of the present invention preferably is constructed with a pair of disks 1 and 2. Each of the disks 1 and 2, at the inner portion of its outer edge is beveled as indicated at 3, the two beveled portions being opposite to each other so as to form a flaring entrance throat at the periphery of the wheel so as to facilitate the introduction of the sprocket chain. Furthermore, each of the disks 1 and 2 on its inner face, a slight distance inward from the periphery thereof, is provided with a flange 4 which extends around the circumference of the wheel and is polygonal in form as indicated in Fig. 2 of the drawing. The polygonal flanges 4 of the two disks 1 and 2, at suitable points therein are formed with radially extending grooves 5, into which are fitted the shanks 6 of the enlarged sprocket members 7. By forming the sprocket members with the enlarged heads 7, shoulders 8 are produced, which bear against the outer portions of the polygonal flanges 4 and thus serve to limit the inward movement of the sprocket heads 7. The inner ends of the shanks 6 of the sprocket members 7 are beveled as shown in Fig. 2 and are fitted into radially extending flaring slots 9 which are formed in an enlarged circular portion 10 with which the disks 1 and 2 are each provided. Extending through the disks 1 and 2 is a shaft 12 which is provided with a key 13 suitably engaging the disks. In assembling the sprocket wheel constructed as shown in Figs. 1 and 2, the disks 1 and 2 are placed together with the hub portion 10 and the polygonal flanges 4 abutting against each other and with the slots 5 and 9 in said flanges and hubs registering with each other. The shanks 6 of the sprocket members 7 are fitted into the registering slots 5 and 9 and bolts 15 provided with heads 16 and nuts 17 are passed through the disks 1 and 2, polygonal flanges 4 and shanks 5 of the different sprocket members 7 so as to hold all of the parts securely in assembled position. It will be noted that the peripheries of the disks 1 and 2 extend a considerable distance beyond the ends of the sprocket members 7 so as to provide means for preventing the sprocket chains from slipping out of engagement with the sprocket wheels. If any of the sprocket members 7 break or otherwise become worn out, the wheel can be repaired by removing the bolt 15 which is connected with the broken or worn out sprocket member and substituting a new sprocket member for the old one. This substitution of a new sprocket member for the old one can be effected without removing the sprocket chain from the wheel. By substituting the sprocket members 7, one at a time, no necessity arises for detaching the disks 1 and 2 from each other. In other words, one of the bolts 15, together with the sprocket member held in place thereby, can be removed without necessitating the removal of the other bolts 15.

The modified form of double wheel, shown in Figs. 3 and 4 is approximately the same as that shown in Figs. 1 and 2. That is to say it is made up of the side disks 1' and 2', each of which is beveled at 3'. The reference numeral 4' indicates the polygonal flange on each of the disks 1' and 2', formed with the radial slots 5' as shown in Fig. 4. The reference numeral 10' indicates the hub member of each disk which is formed with the radial slots 9' in which are fitted the inner ends of the shank members 6' of the sprocket members 7'. The inner ends of the shanks 6' are held in the radial slots 9' by means such as the bolts 21 having nuts 22 and heads 23. In this form of the invention the disks 1' and 2', instead of abutting against each other, are held in spaced relation by means such as the connecting bars 22', which fit at their ends into slots 23' cut in the outer faces of the polygonal flanges 4' and are provided with reduced ends 24 which extend through the disks 1' and 2' and are provided at their outer ends with nuts or other fastening means 25. The connecting members 22' are formed with slots or openings 26 through which extend the shanks 6' of the sprocket members 7'. The members 22' thus serve to brace the outer ends of the shanks 6' and hold them securely in position.

The sprocket wheel of the present invention saves the time and labor which were formerly required to remove the chain under old forms of sprocket devices. It also saves the expense of broken chains and avoids damage to machinery and danger to human life.

The device of the present invention is strong, simple, durable and inexpensive in construction as well as thoroughly efficient and practical in use.

What is claimed as new is:—

1. A sprocket wheel having a disk provided with a beveled periphery, a flange formed with radial slots, and a projecting hub formed with radial slots, the slots of said hub and said flange being in alinement with each other, and a plurality of sprocket members having enlarged heads formed with shoulders bearing against the outer surface of said flange, and shank members fitted into the alined slots of said hub and said flange.

2. A sprocket wheel having a pair of oppositely facing disks each formed at the inner portion of its outer edge with a beveled surface, each of said disks having on its inner face a polygonal flange formed with a plurality of radial slots, and each of said disks also having a projecting hub member formed with a plurality of radial slots in alinement with the slots of said polygonal flange, a plurality of sprocket members each having an enlarged head serving as a sprocket tooth, said head having a pair of flanges bearing against the outer surface of the polygonal flange, each sprocket member having a shank formed integral therewith and extending through one of the pairs of alined slots of the polygonal flange and hub, and a bolt connected with one of said disks and the shank of said sprocket member for securing the same in position.

In testimony that we claim the foregoing as our own, we have hereto affixed our signatures in the presence of two witnesses.

WILLIAM DORTON.
JOHN S. BOYER.

Witnesses:
  JOHN S. CLAY,
  R. FRIGATE.